No. 700,303. Patented May 20, 1902.
P. B. CLARKE.
VERTICAL GRAIN SCALE.
(Application filed Apr. 29, 1901.)
(No Model.) 11 Sheets—Sheet 1.

Fig. 1.

WITNESSES

P. B. CLARKE INVENTOR
BY ATTORNEYS

No. 700,303. Patented May 20, 1902.
P. B. CLARKE.
VERTICAL GRAIN SCALE.
(Application filed Apr. 29, 1901.)
(No Model.) 11 Sheets—Sheet 3.

Fig. 3.

P. B. CLARKE INVENTOR
WITNESSES
ATTORNEYS

No. 700,303. Patented May 20, 1902.
P. B. CLARKE.
VERTICAL GRAIN SCALE.
(Application filed Apr. 29, 1901.)
(No Model.) 11 Sheets—Sheet 5.

Witnesses

P. B. CLARKE, Inventor

Attorneys

No. 700,303.  
P. B. CLARKE.  
VERTICAL GRAIN SCALE.  
(Application filed Apr. 29, 1901.)

(No Model.)

Patented May 20, 1902.

Witnesses

P. B. CLARKE, Inventor

Attorneys

No. 700,303.

Patented May 20, 1902.

P. B. CLARKE.
VERTICAL GRAIN SCALE.
(Application filed Apr. 29, 1901.)

(No Model.)

P. B. CLARKE, Inventor

No. 700,303. Patented May 20, 1902.
P. B. CLARKE.
VERTICAL GRAIN SCALE.
(Application filed Apr. 29, 1901.)
(No Model.) 11 Sheets—Sheet 8.

Fig. 11.

Witnesses

P. B. CLARKE, Inventor
By C. A. Snow & Co.
Attorneys

No. 700,303. Patented May 20, 1902.
P. B. CLARKE.
VERTICAL GRAIN SCALE.
(Application filed Apr. 29, 1901.)
(No Model.) 11 Sheets—Sheet 9.

Fig.12.

Witnesses
P. B. CLARKE, Inventor
Attorneys

No. 700,303. Patented May 20, 1902.
P. B. CLARKE.
VERTICAL GRAIN SCALE.
(Application filed Apr. 29, 1901.)
(No Model.) 11 Sheets—Sheet 11.

P. B. CLARKE, Inventor

UNITED STATES PATENT OFFICE.

PEETE B. CLARKE, OF NEW YORK, N. Y.

VERTICAL GRAIN-SCALE.

SPECIFICATION forming part of Letters Patent No. 700,303, dated May 20, 1902.

Application filed April 29, 1901. Serial No. 57,994. (No model.)

*To all whom it may concern:*

Be it known that I, PEETE B. CLARKE, a citizen of the United States, residing at New York, in the county of New York and State of New York, have invented a new and useful Vertical Grain-Scale, of which the following is a specification.

The invention relates to improvements in vertical grain-scales.
The object of the present invention is to improve the construction of automatic scales, more especially that shown and described in the application filed by me on or about May 26, 1898, Serial No. 681,798, and to adapt the construction of the vertical stoker-scale of an application filed of even date herewith for the weighing of grain and to enable the latter to be accurately weighed.

A further object of the invention is to provide a scale of this character in which when the poising-point is reached the flow of the material will be cut off and the material in the air between the cut-off and the charge-receiving compartment or portion of the load-receiver prevented from passing through the scale without being weighed.

Another object of the invention is to utilize the surplus material which is in the air between the main cut-off and the load-receiver at the instant the poising-point is reached and enable the same to assist the supplemental weights in imparting a downward impetus to the load-receiver after the same has received its full charge.
Another object of the invention is to provide efficient means for controlling the operation of the scale and for preventing more than one weighing operation from taking place when such operating or controlling mechanism is manipulated.

The invention consists in the construction and novel combination and arrangement of parts hereinafter fully described, illustrated in the accompanying drawings, and pointed out in the claims hereto appended.

In the drawings,
Fig. 3 is an elevation, partly in section, of the side opposite that illustrated in Fig. 2.
Fig. 19 is a detail view illustrating the construction for operating the auxiliary cut-offs.

Like numerals of reference designate corresponding parts in all the figures of the drawings.

Figure 1:
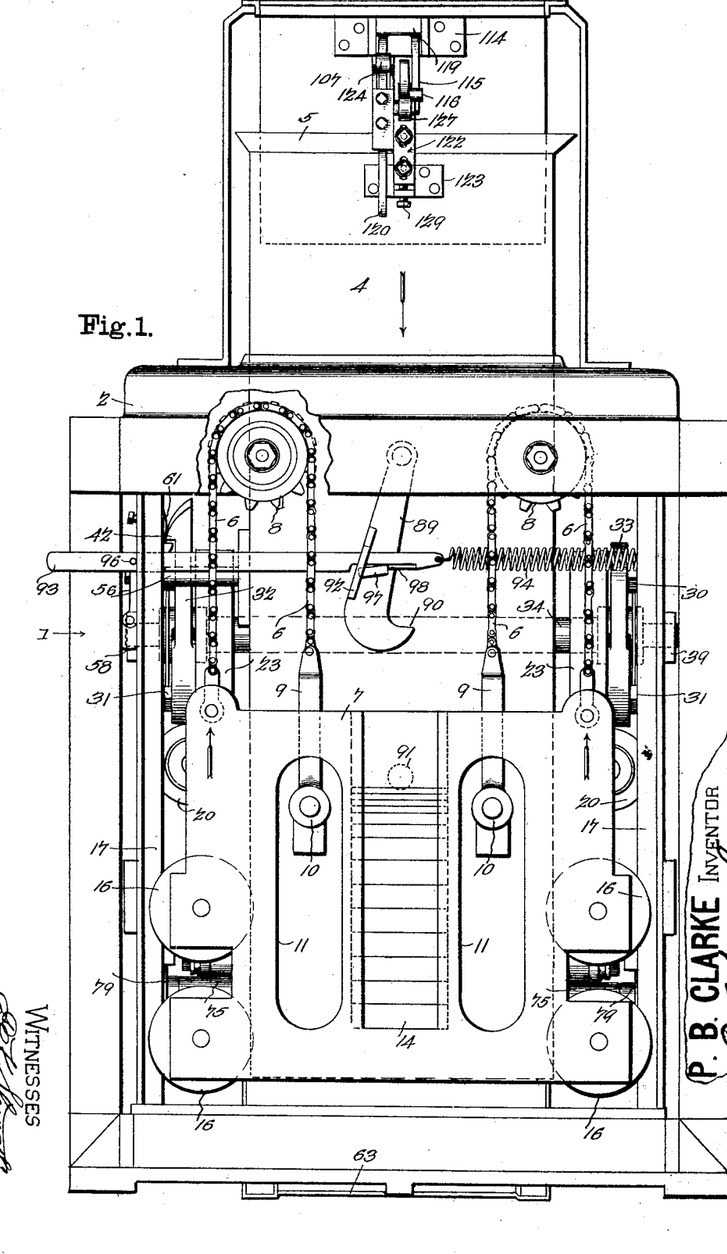
Figures 1 and 2 are elevations of an automatic grain-scale constructed in accordance with this invention.
Figure 2:
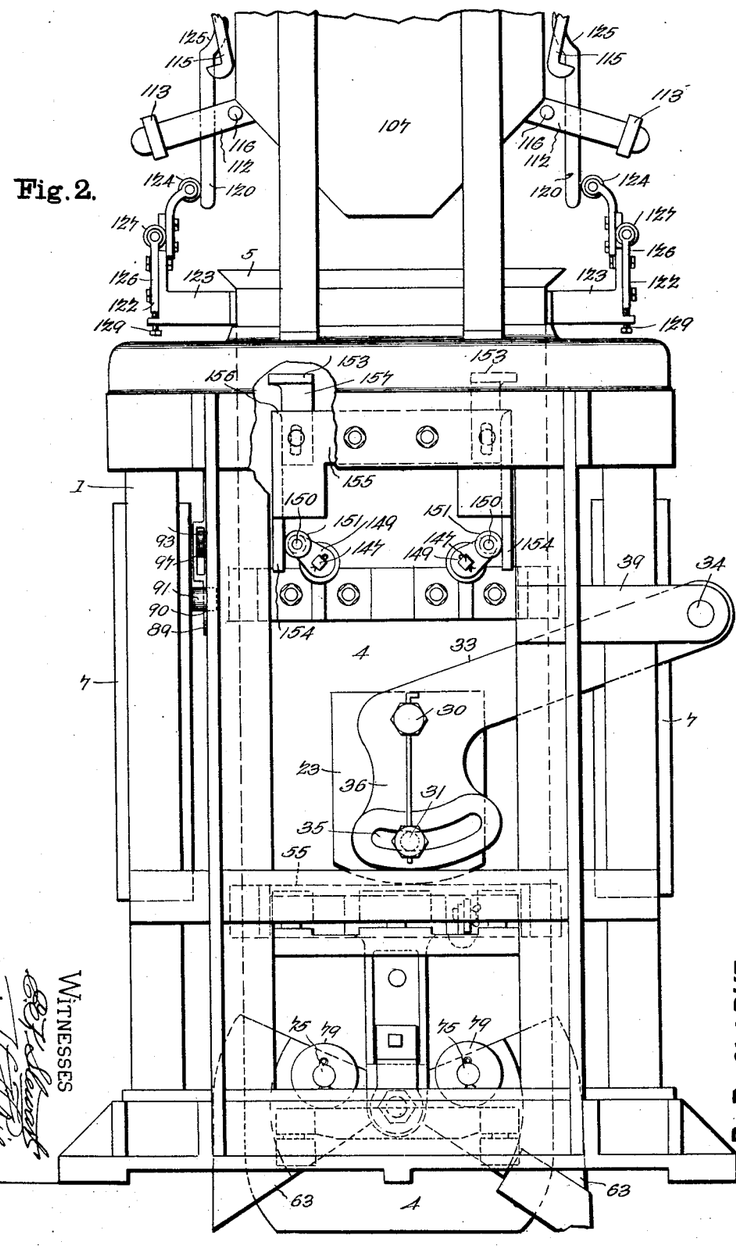
Figure 3:
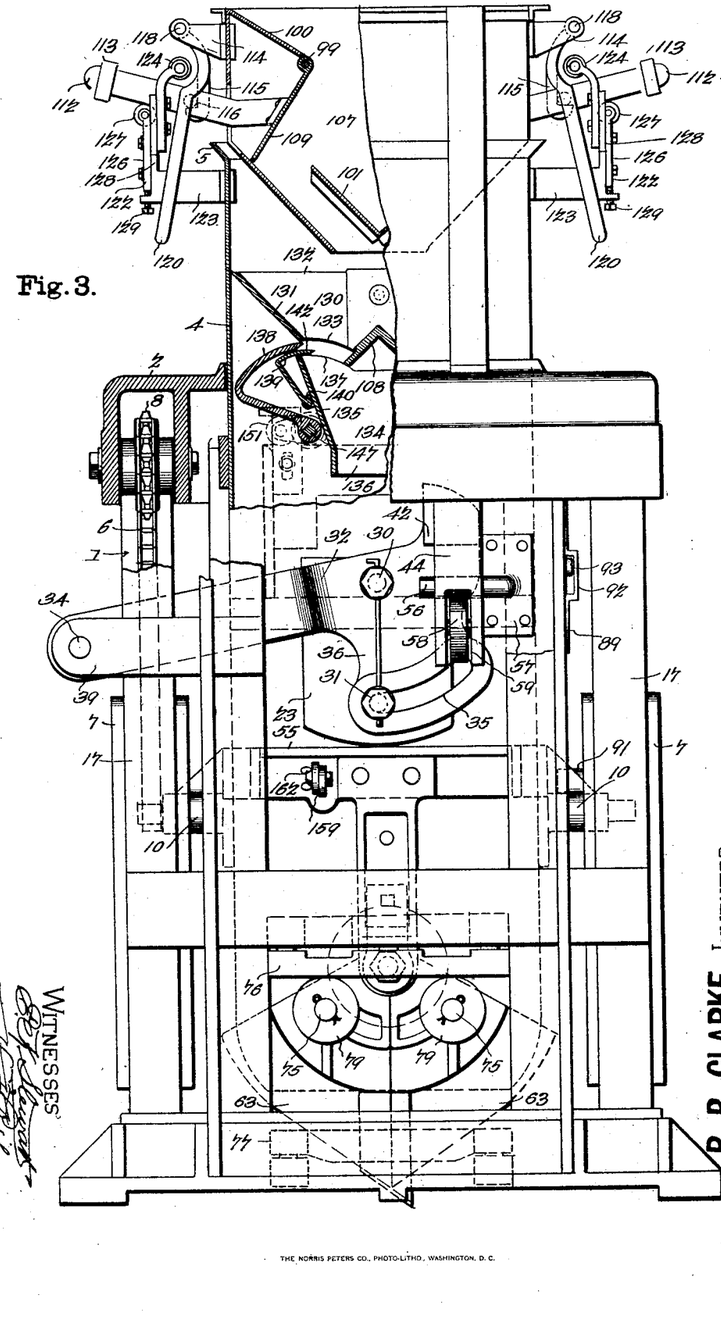
Figure 4:
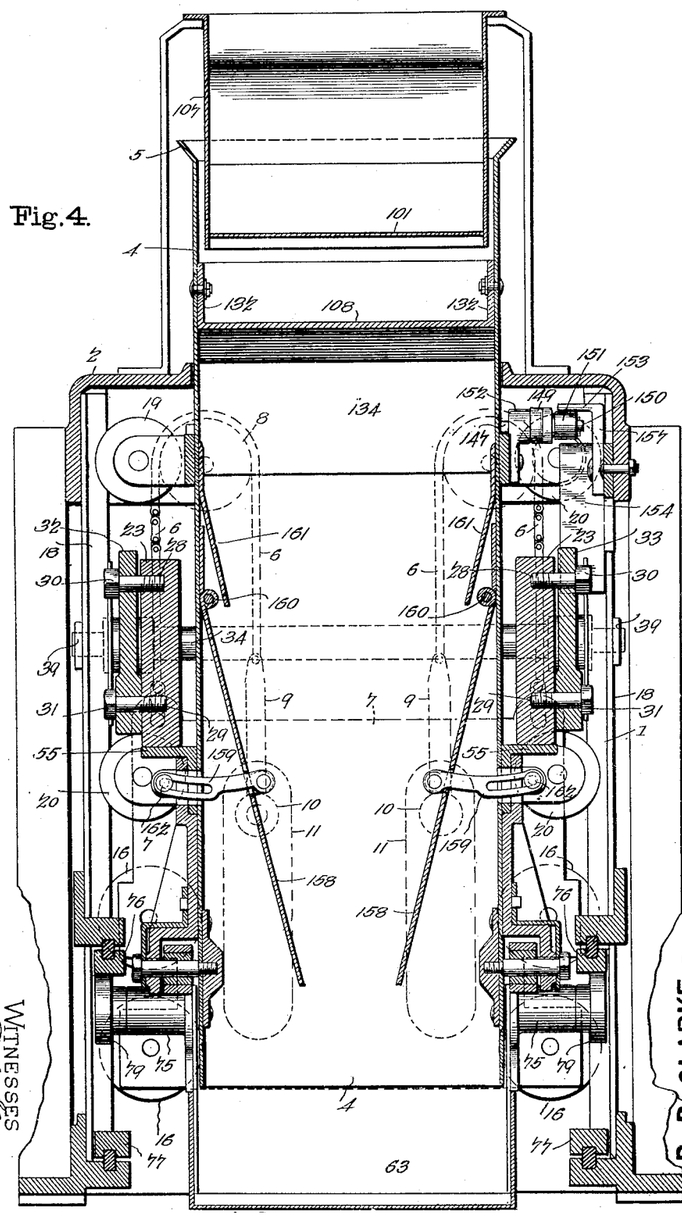
Fig. 4 is a vertical sectional view.
Figure 5:
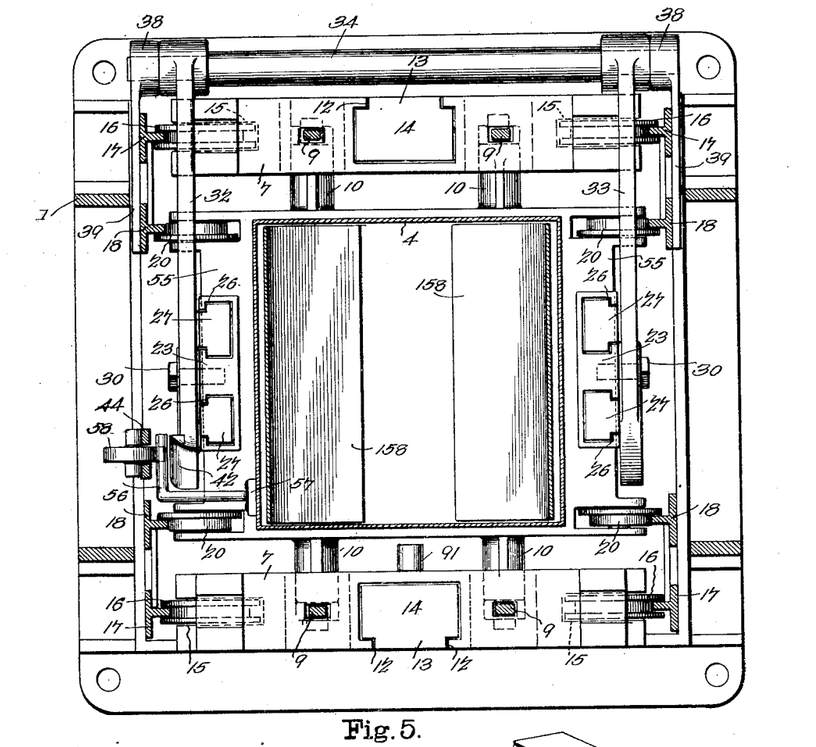
Fig. 5 is a horizontal sectional view.

1 designates a supporting-frame, approximately rectangular in cross-section and preferably composed of upright angle-iron or channel-iron beams and suitable connecting-bars; but the frame may be constructed in any other suitable manner, if desired. Within the supporting-frame is arranged a vertically-movable load-receiver or bucket 4, constructed of sheet metal or other suitable material and having a flaring upper edge or portion 5 and provided at its bottom with a pair of hinged gates, hereinafter described, adapted to open and close automatically when the load-receiver or bucket moves vertically. The load-receiver or bucket, which is adapted to move vertically from the position illustrated in Fig. 2 of the drawings to that shown in Fig. 3, is connected by chains or other suitable flexible connections with scale-weights 7, located at opposite sides of the scale, as clearly illustrated in Fig. 5 of the accompanying drawings. The chains 6 are arranged in pairs and mesh with supporting chain or sprocket wheels 8, arranged in pairs and mounted within an upper horizontally-disposed rectangular frame or casing 2. The sides of the rectangular frame or casing 2 form housings for the chain or sprocket wheels, and the said chains, which depend from the chain or sprocket wheels, are secured at their outer ends to the tops of the scale-weights, at opposite sides thereof, and the inner ends of the chains extend downward and are connected by link-bars or hangers 9 with the vertically-movable load-receiver or bucket. The vertically-movable load-receiver or bucket is provided at opposite sides with suitable projections or studs 10 to receive the lower ends of the link-bars or hangers 9, and the scale-weights, which consist of heavy rectangular plates, are provided with vertical openings 11, receiving the projections or studs 10 of the vertically-movable load-receiver or bucket. The heavy plates which constitute the body portion of the scale-weights are provided between the vertical openings with central vertical sockets 12 and have vertical slots or openings in the front or outer walls of the sockets to receive projections 13 of removable weights 14, which are adapted to be placed in the sockets to vary the effect of the scale-weights and to enable a charge of the exact amount to be weighed by the scale. By these removable weights any variation in the weight of the vertically-movable bucket, the scale-weights, and other parts may readily be corrected. The scale-weights are provided at opposite sides with recesses or grooves 15, in which are mounted grooved guide-wheels 16, arranged to run on outer vertical guides 17 of the supporting-frame, which is also provided with inner guides 18 for upper and lower guide-wheels 19 and 20 of the vertically-movable load-receiver or bucket. The inner and outer guides of the supporting-frame consist of flanges of the uprights or beams of the said frame 1, and the guide-wheels of the scale-weights and the vertically-movable bucket or load-receiver enable the parts to move freely and frictionlessly.

The scale-weights are provided at their tops with bores or openings communicating with the vertical openings 11 and receiving the inner depending portions of the chains or other flexible connections. The scale-weights normally maintain the load-receiver or bucket in an elevated position when the latter is free to move vertically, as it is designed to be locked by means hereinafter described against such vertical movement to hold the scale out of operation. When the scale is free to operate, the scale-weights will maintain the load-receiver or bucket in an elevated position until they are counterbalanced by a charge of material, when the said load-receiver or bucket will move downward under the influence of such charge and also under the influence of supplemental weights 23 in a manner similar to the load-receiver or bucket shown and described in the said applications. The supplemental weights, which preferably consist of heavy plates, are provided with opposite sockets or wells 26 and are designed during the first portion of the weighing operation to partially counterbalance the scale-weights to cause the load-receiver or bucket to commence its descent before it has received a full charge, and the said supplemental weights are then temporarily supported by the means hereinafter described until the load-receiver or bucket has received a full charge, when they are tripped and caused to fall upon the load-receiver or bucket to impose an additional weight upon the same when the poising-point is reached, whereby an additional downward impetus is imparted directly to the load-receiver or bucket to cause a rapid operation of the scale and to produce a positive and effective operation of the cut-offs, as hereinafter described. The supplemental weights are located at the sides of the load-receiver or bucket where the scale-weights are not placed, and the sockets or wells 26, which are arranged vertically, are located at opposite sides of the center of the supplemental weights and are provided with removable weights 27, which may be varied in number to enable a supplemental weight of the desired heft to be obtained.

Between the vertical weight-receiving sockets or wells are arranged upper and lower perforations 28 and 29, receiving an upper pivot 30 and a lower fastening device 31 for connecting the supplemental weights with a pair of arms 32 and 33 of a shaft 34, located at one side of the supporting-frame and keyed or otherwise secured to the said arms, whereby the latter will oscillate in unison when the shaft is partially rotated. The arms 32 and 33 are provided with upper perforations to receive the pivots, and they have lower curved slots 35, receiving the fastening devices 31 and permitting the necessary lateral movement of the depending portions 36 of the arms in which the said slots are formed. The depending portions of the arms are moved laterally of the supplemental weights when the arms swing upward and downward, and the supplemental weights have a slight lateral movement or play; but this lateral movement, owing to the position of the pivots with relation to the swing of the arms, is so very slight that the weights may be permitted to move bodily. The horizontal shaft 34 is journaled at its ends in suitable bearings 38, provided with plates or arms 39, arranged horizontally and suitably secured to the uprights or beams of the supporting-frame. When the supplemental weights move vertically, the arms are oscillated, and as the latter are fixed to the shaft 34 the weights 23 will move uniformly. The sockets or wells 26 of the supplemental weights are constructed similar to those of the scale-weights, and the removable weights 27 are provided with front or outer projecting corners, which fit in the front slots or openings and which have their outer edges flush with the outer faces of the supplemental weights.

Figures 6, 7, 8:
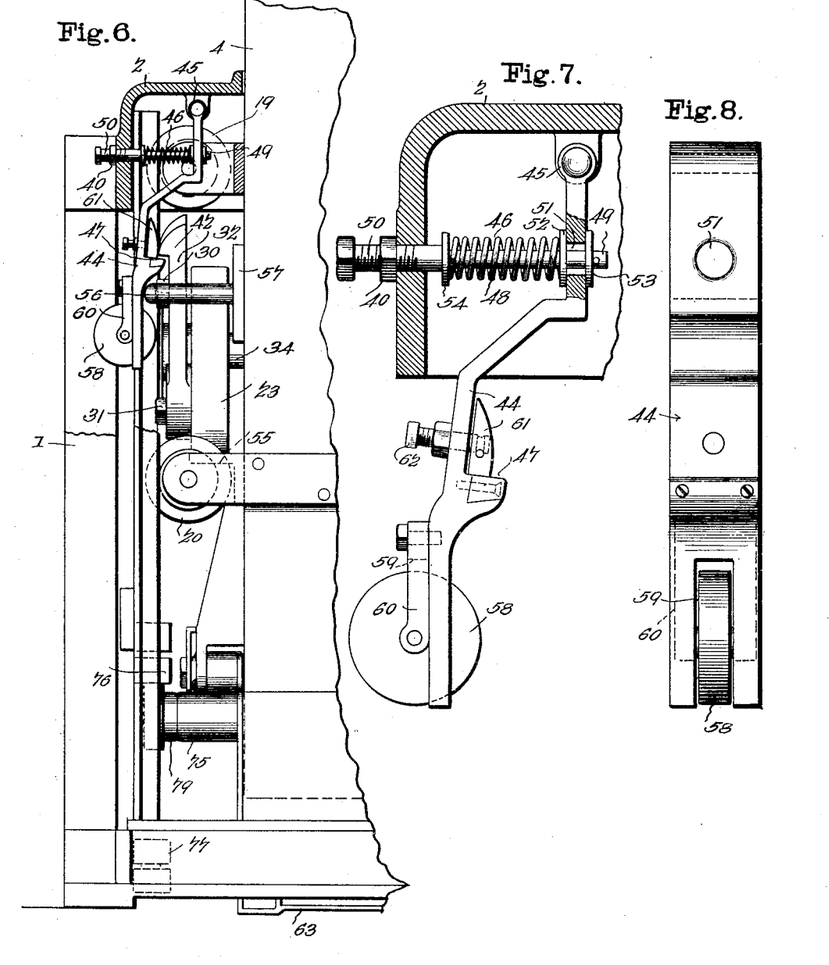
Fig. 6 is a vertical sectional view of one side of the scale, illustrating the construction for supporting and tripping the supplemental weights.
Fig. 7 is an enlarged sectional view illustrating the manner of mounting and adjusting the catch for supporting the supplemental weights.
Fig. 8 is an elevation of the catch.

The arm 32 is provided with a beveled tooth or head 42, presenting an inclined or beveled side face, and having a lower shoulder which is adapted to be engaged by a spring-actuated catch 44, whereby the supplemental weights are supported in an elevated position. The spring-actuated catch is pivoted at its upper end 45 within the rectangular frame or casing 2, and it is protected by the same and prevented from becoming clogged by any escaping material, and by being housed in this manner it will not require cleaning as often as it would were it located in an exposed position. It is provided near its center with a shoulder or ledge 47, and it is beveled beneath the same, and it is engaged by a tension device 46, located near the upper end of the catch, as illustrated in Fig. 7 of the accompanying drawings; but it may be arranged in any other position above or below the shoulder or ledge 47, if desired. The tension device consists of a spring 48, mounted on a bolt or screw 49, having a threaded outer portion 50, which engages a threaded perforation of the horizontal frame 2 or other portion of the supporting-frame 1. The outer end of the adjusting screw or bolt is provided with a head, and its inner end is swiveled to the catch, preferably by being passed through a slot 51 thereof, and washers 52 and 53 are arranged on the inner portion of the adjusting-screw at opposite sides of the catch, the washer 52 being engaged by the spring 48, which is interposed between the said washer 52 and a washer 54. The washer 54 is mounted on the adjusting-screw and fits against a shoulder formed by reducing the inner portion of the adjusting-screw. The adjusting-screw is adapted to be rotated to move the inner washer 54 inward and outward, and thereby vary the tension of the coiled spring 48, and it is clamped at any desired adjustment by means of a jam-nut 40, arranged at the exterior of the horizontally-disposed frame 2.

After the vertically-movable load-receiver or bucket has discharged its contents, as hereinafter explained, and is free to move vertically it is carried upward by the scale-weights, which also move the supplemental weights vertically, the said load-receiver or bucket being provided with supporting ledges or flanges 55. The engaging portion of the arm 32 is held slightly above the supporting ledge or shoulder 47 of the catch 44 while the load receiver or bucket is receiving the main portions of its contents and until the weight of the charge and the supplemental weights are sufficient to counterbalance the scale-weights, and the said bucket or receiver will then commence to descend and will fall until the engaging portion or head of the arm 32 rests upon the supporting ledge or shoulder 47. This is effected by a slight downward movement of the load-receiver or bucket, and after the latter has received its full charge it commences to descend, and such downward movement automatically trips the supplemental weights, which fall upon the bucket or load-receiver, thereby imposing directly on the same an additional weight when the poising-point is reached and imparting an additional downward impetus to the same. This produces a sudden sharp and positive operation of the scale, and the material is thereby accurately weighed.

The supplemental weights are tripped by means of an approximately L-shaped arm 56, formed integral with a plate 57, and the said arm, which extends around the engaging portion or head 42, is interposed between the same and the spring-actuated catch, and it is located above an antifriction-wheel 58, as clearly illustrated in Fig. 6 of the accompanying drawings, when the load-receiver or bucket is raised or in position for receiving the material. The wheel 58, which extends through a slot 59 of the catch, is mounted in a bracket 60, and it forms a beveled projection at the inner face of the catch. When the load-receiver or bucket first moves downward under the influence of a partial charge and the supplemental weights and the engaging portion or head 42 is carried downward to the supporting ledge or shoulder 47, the tripping arm or device 56 is carried downward to a point nearly contiguous to the wheel 58, whereby the slightest downward movement after the bucket or load-receiver has obtained a full charge will cause the catch to be forced outward to withdraw the support from beneath the shoulder 43 of the engaging portion or head 42, and thereby cause the supplemental weights to drop upon the load-receiver or bucket. The bracket, which consists of a bifurcated plate, is secured at its upper end to the catch, as clearly illustrated in Fig. 7 of the accompanying drawings, and it may be adjustably mounted in any suitable manner to enable the wheel to be raised and lowered to position it properly with relation to the tripping device 56. The tripping of the supplemental weights is also controlled by means of an adjustable plate 61, mounted on the catch and located above and resting upon the supporting shoulder or ledge 47. This plate 61 has an adjusting-screw 62 swiveled to it, and by rotating the latter the plate 61 may be moved inward and outward to vary the size of the exposed portion of the shoulder or ledge 47 to make the catch more or less sensitive. The adjustable plate 61 is locked at the desired adjustment by means of a jam or lock nut mounted on the adjusting-screw and engaging the back of the catch, as clearly shown in Fig. 7. When the supplemental weights are carried upward, the beveled side face of the engaging portion of the head 42 will contact with the beveled face beneath the shoulder or supporting ledge 47 of the catch, and the latter will be forced outward to permit the engaging portion or head 42 to pass the shoulder or ledge 47. As soon as the engaging portion or head has passed the shoulder or ledge the catch will spring inward, and the said engaging portion or head will project over the shoulder or ledge and will be supported by the same when the load-receiver or bucket again moves downward.

The vertically-movable load-receiver or bucket is provided at its lower end with a pair of hinged gates 63, arranged as clearly shown in Fig. 3, and the weight of the material is adapted to hold the gates normally closed. These hinged gates are constructed similar to those shown and described in the said application filed of even date herewith, and as they do not constitute any portion of the novelty of the present invention a detailed description of the construction and manner of mounting the same is deemed unnecessary. The gates are hinged at the top and are provided with projecting studs 75, arranged in the spaces between upper and lower buffers or stops 76 and 77, and are adapted to be alternately engaged by the same, whereby the dumping-gates are positively opened and closed. When the dumping-gates are carried downward by the load-receiver or bucket, the studs 75 engage the lower stops or buffers and cause the dumping-gates to open automatically to permit the contents of the load-receiver or bucket to be discharged, and when the load-receiver or bucket is carried upward by the scale-weights the studs or projections 75 engage the upper stops or buffers and the dumping-gates are automatically closed and locked. The studs or projections are provided with wheels 79, which are adapted to move frictionlessly on the upper and lower buffers.

Figures 9, 10:
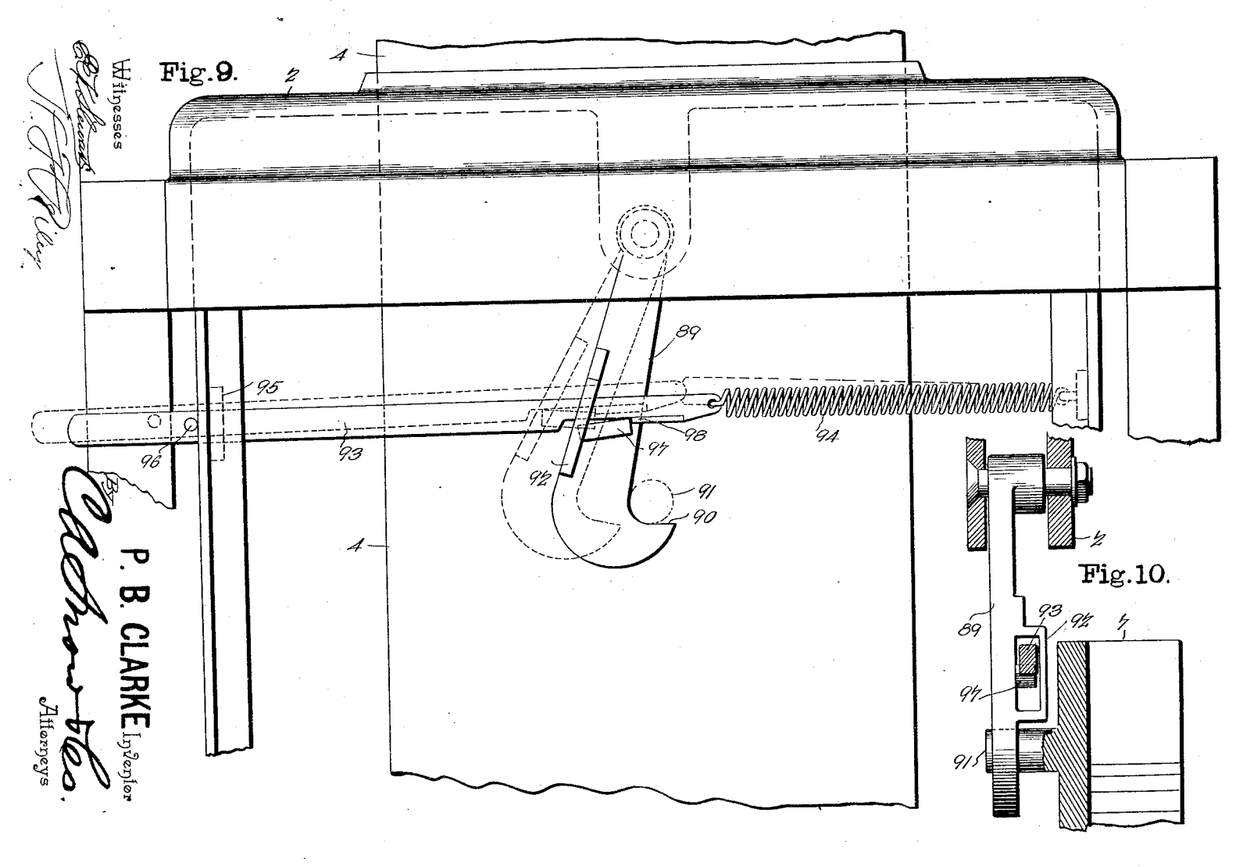
Fig. 9 is a detail view illustrating the construction for tripping the hook for supporting the scale-weights in an elevated position.
Fig. 10 is a detail sectional view illustrating the manner of mounting the hook.

The scale is held or prevented from operating continuously by means of a latch 89, pivoted at its upper end to the supporting-frame within the rectangular frame or casing 2 and provided with an enlarged lower end or head having a shoulder 90, adapted to engage a projection 91 of the adjacent scale-weight. The latch, which is arranged within the path of the projection 91 of the scale-weight, is held in engagement with the same by gravity and is beveled below the supporting-shoulder to enable it to be engaged automatically. When the scale-weights are raised by the downward movement of the load-receiver or bucket, the projection 91 contacts with the lower portion of the pivoted latch and swings the same laterally. When the projection 91 arrives at a point above the supporting-shoulder 90, the latch swings inward automatically and carries the said supporting-shoulder beneath the projection 91, and thereby locks the scale-weights against downward movement and holds the load-receiver or bucket in its lowermost position. The pivoted latch is provided with a guide 92, consisting of a laterally-projecting loop or portion having an opening to receive a reciprocating bar 93, arranged approximately horizontally and connected at its inner end with a coiled spring 94, which is secured at its outer end to the supporting-frame, as clearly indicated in Fig. 9 of the accompanying drawings. The outer portion of the operating-bar 93 is arranged in a guide-opening 95 of the supporting-frame and is provided with a stop 96, arranged to engage the supporting-frame to limit the inward movement of the bar 93. The latch is provided adjacent to the guide 92 with a lug 97, extending into the guide and arranged at a slight inclination when the latch is in engagement with the projection 91, as indicated in full lines in Fig. 9 of the drawings. This lug is arranged to be engaged by a shoulder 98, formed by a wear-plate and arranged at the inner edge of the lug, at the top of the same, as clearly shown in Fig. 9. When the bar 93 is drawn outward, the shoulder 98 engages the inner side edge of the lug and swings the latch outward, the lug describing a portion of a circle and changing its position gradually until its outer edge is higher than the inner edge, and a continued outward movement of the bar 93 will swing the lug upward sufficiently to cause its outer edge to engage the bar 93 and lift the shoulder 98 thereof out of engagement with the inner edge of the lug, whereby the latch will be released and caused to swing inward or backward and lie in the path of the projection 91 of the scale-weight. By this construction a single operation of the scale is insured when the bar 93 is drawn outward, and the scale is prevented from accidentally operating continuously should the said bar 93 be held in its extended position by the operator. In order to cause a second operation of the scale, the reciprocating bar 93 must be moved inward sufficiently to reëngage the shoulder 98 with the inner edge of the lug 97. When the bar 93 is drawn outward, the latch will be carried out of engagement with the projection 91 to allow a single operation of the scale, and it will be automatically tripped and caused to swing backward to its normal position, and after the bar 93 is released it will be carried inward by the coiled spring 94, which is distended by such operation. The bar 93 is recessed adjacent to the shoulder 98, and the wear-plate which forms the latter is designed to be readily renewed when it has become worn.

The upper portion of the load-receiver or bucket is located beneath a supply chute or hopper 107, having a contracted lower end, located directly above a spreader 108 and adapted to be closed by main cut-offs 109 to shut off the flow of the material after the poising point is reached. The contracted bottom of the supply chute or hopper is formed by inclining the opposite walls inward, and the cut-offs, which consist of straight plates, are hinged at their upper edges 99, at inclined deflectors 100, and are adapted to swing inward against a centrally-arranged approximately V-shaped breaker 101, located in the path of the material and adapted to break the fall of the same and relieve the load-receiver or bucket of the jar caused by material dropping upon it from a considerable height. The deflectors 100 consist of inclined plates or partial partitions extending downward and inward and having their lower edges located directly above the upper side edges of the V-shaped breaker 101. When the main cut-offs swing inward, as hereinafter explained, the material is confined above the V-shaped breaker, which supports the said material. The sides of the centrally-arranged V-shaped breaker 101 are arranged parallel with the inclined portions of the walls of the supply chute or hopper, and narrow passages are thus formed for the discharge of the grain. The upper edges of the main cut-offs are provided with eyes for the reception of suitable pintles; but any suitable means may be employed for hingedly mounting the main cut-offs within the chute or hopper.

Figures 17, 18:
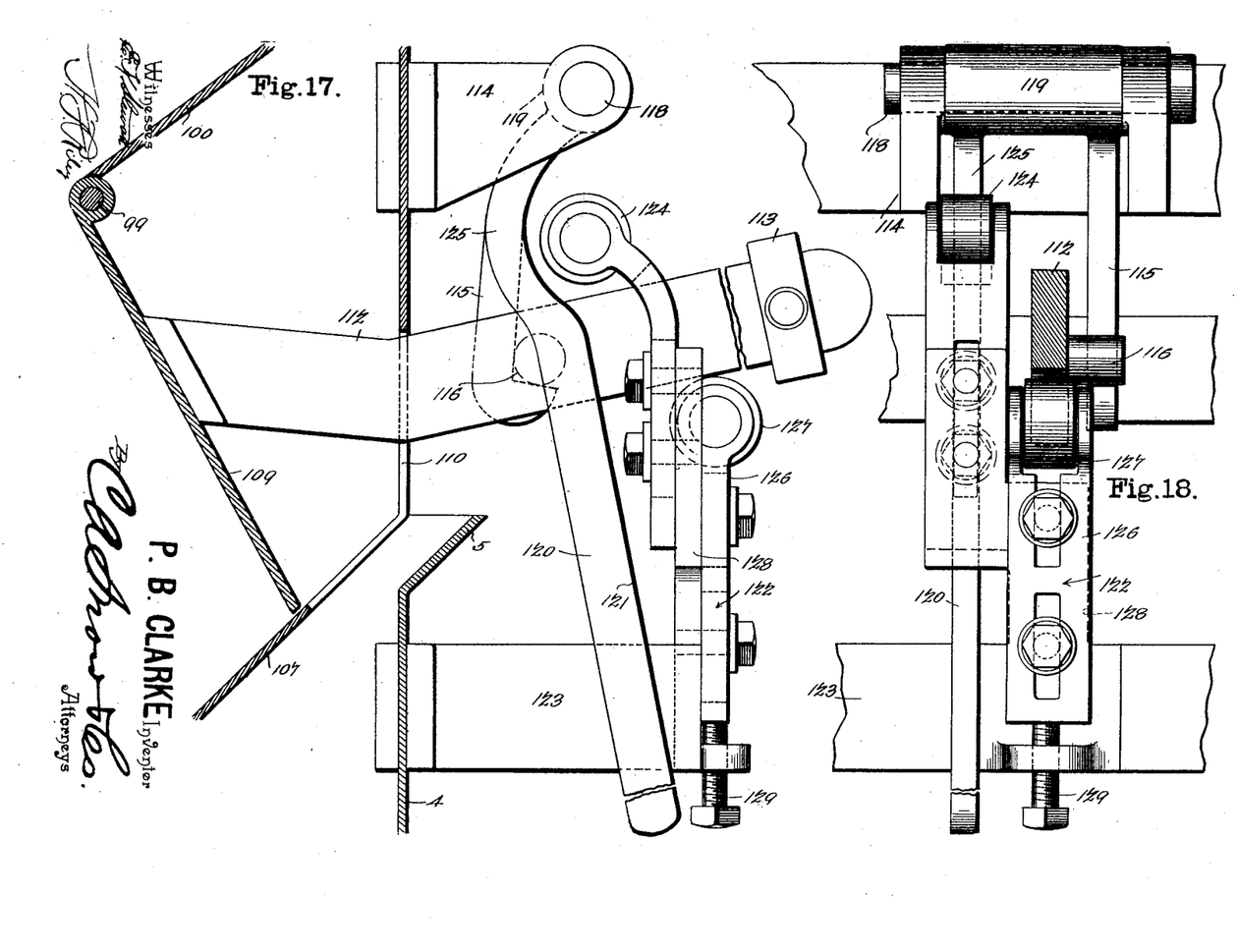
Figs. 17 and 18 are enlarged detail views illustrating the construction for opening and tripping the main cut-off.
Figure 19:
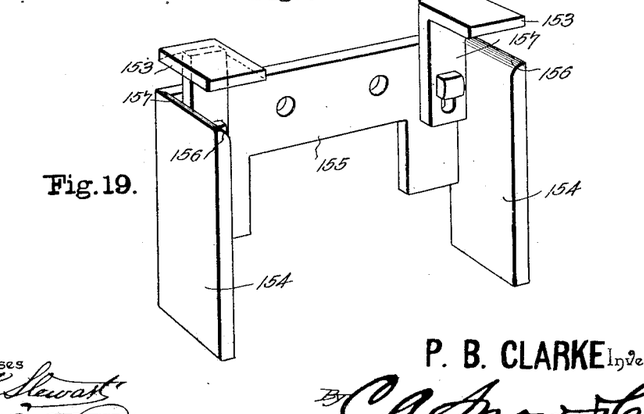

The main cut-offs are provided with outwardly-extending weighted arms 112, extending through suitable slots 110 of the adjacent sides of the chute or hopper and adapted when released to close the cut-offs automatically. The arms, which are provided with adjustable weights 113 on their outer portions, are locked in an elevated position to hold the main cut-offs open by means of latches 115, pivoted at their upper ends to suitable brackets or supports 114 and adapted to engage a laterally-extending lug or projection 116 of the said arms. The brackets or supports 114 are provided with outwardly-extending arms having perforations for the reception of a pivot 118, which also passes through an eye 119 of the latch 115. The latch, which depends from the pivot or pintle 118, is maintained by gravity within the path of the lug or projection of the weighted arm, and when the latter is moved upward by the means hereinafter described the latch automatically engages the lug or projection 116 and holds the cut-off in its open position. The latch which is arranged at one end of the eye 119 is provided with a depending arm or lever 120, normally arranged at a slight inclination and provided with a straight lower edge 121, adapted to be engaged by a tripping device 122, carried by the vertically-movable load-receiver or bucket. The tripping device 122 consists of an adjustable plate or bar mounted on a bracket 123 and provided at its upper end with a roller or antifriction-wheel 124, mounted in a bifurcation of the upper end of the tripping device. When the cut-off is open, as illustrated in Fig. 17 of the accompanying drawings, the roller or antifriction-wheel of the tripping device is located above and at one side of the weighted arm of the cut-off and is received within a recess formed by a curved portion 125 of the arm or lever 120 and located above the straight inclined edge 121. When the load-receiver or bucket moves downward, the roller or end friction-wheel of the friction device 122 engages the arm or lever 120 at the upper end of the inclined edge and swings the same inward and carries the latch 115 out of engagement with the lug or projection of the weighted arm 112 and permits the latter to close the cut-off. When the load-receiver or bucket moves upward, it carries lifting-bars 126 into engagement with the weighted arms 112, which are thereby swung upward into engagement with the latches 115. The lifting-bars, which are located beneath the arms, have bifurcated upper ends and are provided with rollers 127 and are adjustably mounted on the bracket 123. The bracket 123, which extends outward from the upper portion of the load-receiver or bucket, is provided with an upwardly-extending vertical portion 128, upon which the tripping device and the lifting-bar are mounted. The upwardly-extending portion of the bracket has a laterally-offset upper portion, and the tripping device and the lifting-bar are arranged side by side on the upper and lower portions of the vertical arm or portion 128 of the bracket 123, as clearly illustrated in Fig. 18 of the drawings. The tripping device and the lifting-bar are slotted to receive bolts or other suitable fastening devices and are thereby adjustably mounted on the brackets 123. The lifting-bar is also supported by a lower screw 129, mounted in a perforated lug or ear of the bracket 123 and adapted to form an adjustable stop to prevent the lifting-bar from being accidentally moved longitudinally by the constant striking of the same against the weighted arm 112. When the scale-weights are counterbalanced by a partial charge and the supplemental weights, the load-receiver or bucket moves downward slightly until the supplemental weights are supported by the spring-actuated catch, as before explained. This slight downward movement carries the tripping devices downward nearly to the upper ends of the inclined portions or edges of the arms or levers 120 of the latches 115, and when the load-receiver or bucket receives the rest of its charge and the poising-point is reached the downward movement of the same will cause the tripping devices, immediately following the tripping of the supplementary weights, to engage the arms or levers 120 and release the weighted arms, which instantly close the main cut-offs. This cuts off the flow of material. The upward movement of the load-receiver or bucket under the influence of the scale-weights carries the setting and tripping devices from the position illustrated in Fig. 12 to that shown in Fig. 11 and opens the cut-offs.

Figure 11:
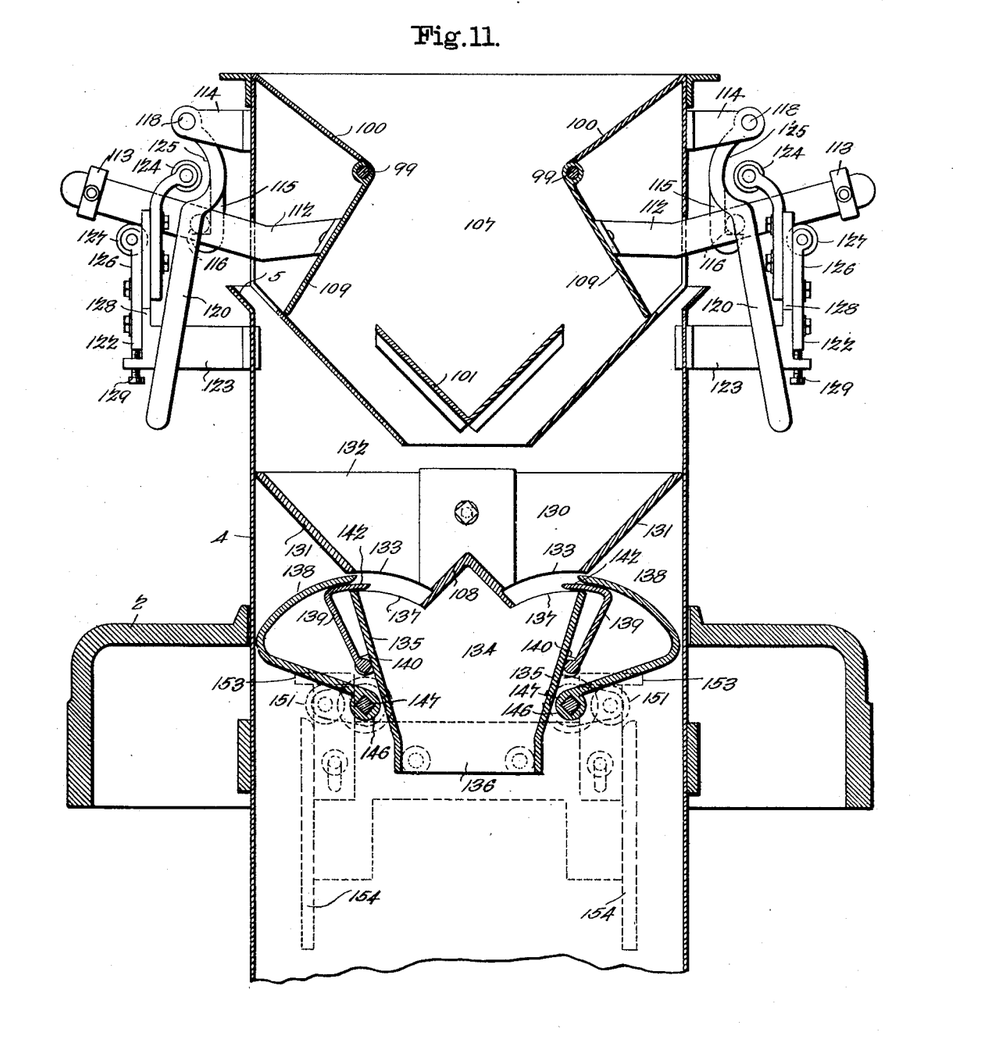
Figs. 11 and 12 are enlarged vertical sectional views of the upper portion of the scale, showing the vertically-movable load-receiver up and down.
Figure 12:
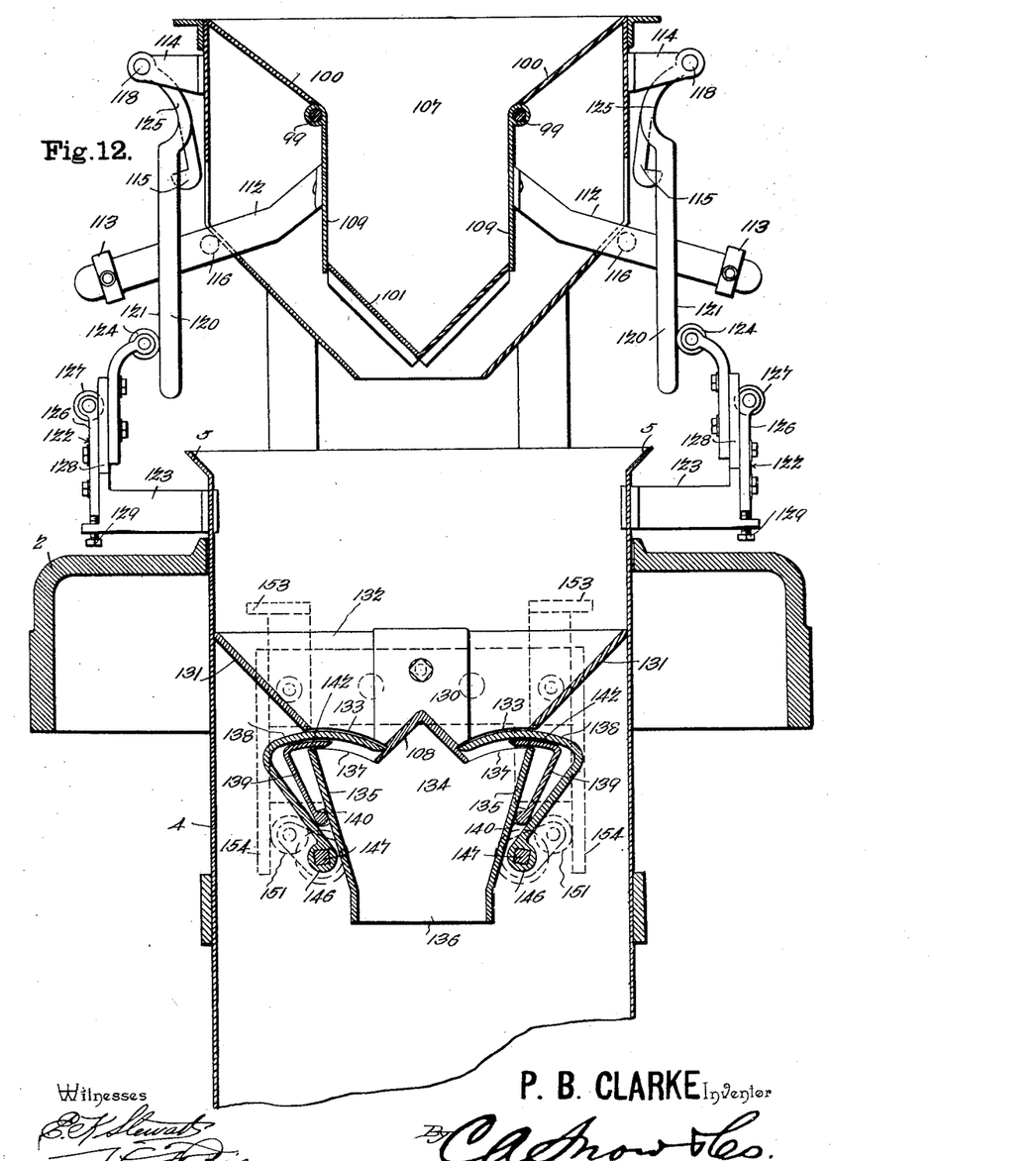

The breaker 101, which is arranged between the main cut-offs, consists of a substantially V-shaped piece having upwardlyinclined sides, as clearly indicated in Figs. 11 and 12 of the drawings.

The spreader 108, which is inverted-V shaped in cross-section, consists of a bar, preferably cast integral with a sleeve or frame 130, provided with downwardly and inwardly inclined side walls 131, forming deflectors and adapted to direct the material toward the spreader 108, which is located between and spaced from the lower edges of the inclined walls 131. The other sides 132, which connect the inclined sides 131, are suitably secured to the load-receiver or bucket and are provided with lower curved edges 133. The inclined sides of the spreader 108 project downward beyond the curved edges 133 and abut against the adjacent upper edges of a neck 134, approximately rectangular in cross-section, provided with slightly-inclined side walls 135, which extend downward from points beneath the inclined walls 131. The neck, which forms a contracted chute or passage for the material, is provided at its sides 136 with curved upper edges 137, spaced from the curved edges 133 of the sleeve 130 and coöperating with the same to form curved ways for auxiliary cut-offs 138. The material passes downward into the lower portion of the load-receiver or bucket through the spaces or openings between the spreader and the inclined side walls 135 of the neck 134, and the size of these openings may be varied by means of adjustable cut-offs or valves 139, hingedly mounted at the exterior of the inclined sides of the neck, as clearly shown in Figs. 11 and 12. The tapering neck is provided at opposite sides with ears 140, arranged in pairs and receiving the pintles or pivots of the adjustable cut-off or valve 139. These adjustable cut-offs or valves 139, which are approximately inverted-L shaped, are provided with curved tops or flanges 142, which are adapted to extend inward over the top of the contracted neck to a greater or less extent. One or both of the pintles or pivots of the valves or cut-offs 139 may be provided with a ratchet-wheel 143, which is engaged by a rigid pawl 144, mounted on a projection or lug 145 and adapted to be removed therefrom when it is desired to adjust the valve or cut-off 139. The lug or projection 145 is polygonal, and the pawl is provided with a polygonal opening to receive the same, and it is retained thereon by a key or other suitable fastening device. When the pawl 144 is drawn outward and disengaged from the ratchet-wheel 143, the valve or cut-off 139 may be moved in either direction.

Figures 13, 14:
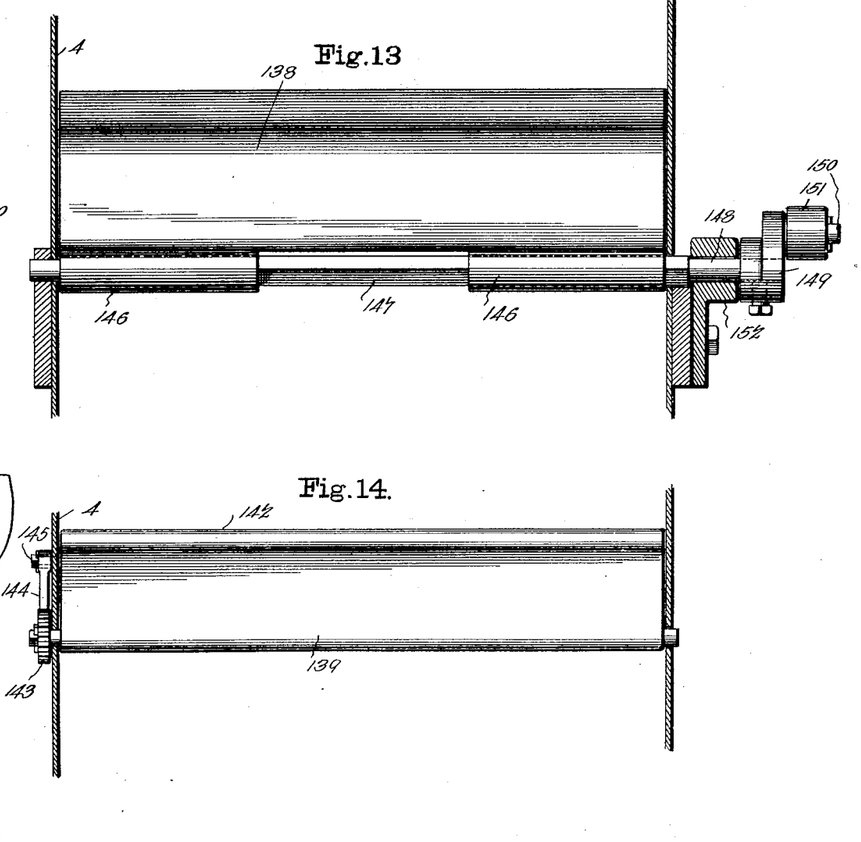
Fig. 13 is a detail view illustrating the manner of mounting the automatic auxiliary cut-offs.
Fig. 14 is a similar view illustrating the manner of mounting the adjustable cut-offs for controlling the size of the inlet-openings at the top of the load-receiver.
Figure 15:
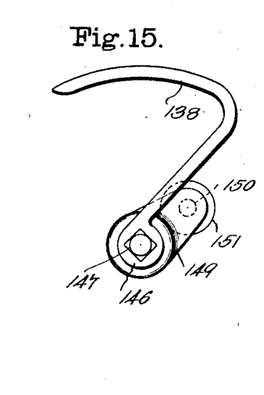
Fig. 15 is a detail view of the auxiliary cut-off.
Figure 16:
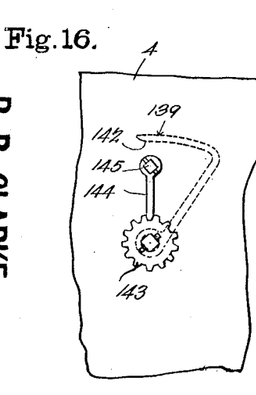
Fig. 16 is a detail view illustrating the construction for securing the adjustable cut-off.

The auxiliary cut-offs 138, which are arranged outside the valves 139, are provided with curved top portions and straight lower portions, and they are provided at their lower edges with eyes 146 for the reception of rock-shafts or pintles 147. The rock-shafts or pintles are squared to conform to the configuration of the openings of the eyes, and they have rounded end portions journaled in suitable bearings of the sides of the load-receiver or bucket. These shafts or pintles are provided at one side of the load-receiver or bucket with extensions 148, upon which are mounted arms 149, having laterally-extending pivots or spindles 150, upon which are mounted antifriction wheels or rollers 151. The arms are secured to the end portions of the shafts or pintles by means of clamping-screws or other suitable devices, as clearly illustrated in Fig. 13 of the accompanying drawings, and the adjacent bearings 152 are removable and enable the parts to be readily assembled and separated. The auxiliary cut-offs are adapted to swing inward from the position illustrated in Fig. 11 of the drawings to that shown in Fig. 12 to close the spaces at opposite sides of the spreader, and thereby prevent any material which is in the air after the poising-point is reached from entering the lower portion or charge-compartment of the load-receiver or bucket. By this construction the load-receiver or bucket is permitted to obtain only the exact amount of a charge of material, and all surplus material is prevented from entering the lower portion or charge-compartment and no material is permitted to pass through the scale without being properly weighed. The surplus material falling upon the closed auxiliary cut-offs and lying above the same and the spreader will operate to assist the supplemental weights in imparting a downward impetus to the load-receiver or bucket after the poising-point is reached, and when the load-receiver or bucket moves upward again and the auxiliary cut-offs are opened the said surplus material will fall into the lower portion of the load-receiver or bucket and constitute a portion of the next charge.

The automatic operation of the auxiliary cut-offs is effected by means of upper and lower stops 153 and 154, arranged to be engaged by the arms 149. The lower stops are elongated and form vertical tracks for the antifriction wheels or rollers, and they operate to close the auxiliary cut-offs and maintain the same in their closed position during the descent of the load-receiver after the poising-point is reached and until the said load-receiver is again raised by the scale-weights and the dumping-gates have been closed. The lower stops 154 consist of vertical bars or flanges extending at right angles from a plate or frame 155 and provided with rounded or beveled upper edges 156, located beneath and arranged to engage the antifriction rollers or wheels 151 when the load-receiver or bucket moves downward. The plate or frame 155 is bolted or otherwise secured to the upper frame-casting 2, and the upper stops 153 consist of horizontal flanges extending outward from vertical plates 157. The vertical plates 157, which are slotted for the reception of suitable fastening devices, are adjustable and extend above the frame or plate 155, the horizontal flanges being in position to be engaged by the antifriction rollers or wheels of the arms 149 when the load-receiver moves upward. The auxiliary cut-offs are purely automatic in their operation and prevent any material from entering the lower portion of the load-receiver or bucket after the same has received its full charge and while the dumping-gates are open.

In order to cause the material of a charge to properly fill the load-receiver or bucket, the latter is provided with a pair of adjustable plates 158, forming opposite side walls and hinged at their upper edges and adjustably connected with the adjacent walls of the load-receiver or bucket by means of slotted arms 159. The hinges 160, which connect the upper edges of the plates 158 to the load-receiver or bucket, are located beneath guards 161, which prevent the material from lodging on the hinges. The slotted arms 159 are pivoted at their inner ends to the plates 158, and they extend through openings of the adjacent walls of the load-receiver or bucket and are adjustably secured to exterior brackets by suitable clamping devices 162. These clamping devices preferably consist of bolts and nuts; but any other suitable means may be employed for this purpose. By adjusting the clamping-plates a given charge of material may be caused to rise to the desired height within the load-receiver or bucket.

What I claim is—

1. The combination of a vertically-movable load-receiver, scale-weights connected therewith, a supplemental weight, a catch arranged in the path of the supplemental weight and adapted to support the same, means for tripping the catch, and a tension device consisting of an adjusting-screw swiveled to the catch, and a coiled spring mounted on the adjusting-screw and engaging the same and the catch, substantially as described.

2. The combination of a frame or casing, a vertically-movable load-receiver, scale-weights connected therewith, a supplemental weight, a catch for supporting the supplemental weight, means for tripping the catch, and a tension device consisting of an adjusting-screw mounted in a threaded opening of the frame or casing and loosely passing through the catch, washers mounted on the adjusting-screw and located at opposite sides of the catch, and a spring engaging the screw and the catch, substantially as described.

3. The combination of a vertically-movable load-receiver, a frame or casing, scale-weights connected therewith, a supplemental weight, a catch pivotally mounted at its upper end on the frame or casing and arranged to support the supplemental weight, an adjusting-screw mounted in a threaded opening of the frame or casing and passing through the catch, a spring disposed on the adjusting-screw and engaging the catch, and means for tripping the catch, substantially as described.

4. In a scale, the combination of a vertically-movable load-receiver, a latch for locking the scale out of operation, a reciprocatory operating-bar arranged horizontally and engaging the catch, and means for automatically lifting the bar when the same is reciprocated, whereby the bar will be automatically disengaged from the latch, substantially as described.

5. In a scale, the combination of a vertically-movable load-receiver, a latch for locking the scale out of operation, said latch being arranged to swing, and provided with a lug, and a bar detachably engaging the lug and arranged to be lifted out of such engagement when the latch swings, substantially as described.

6. In a scale, the combination of a vertically-movable load-receiver, a latch for locking the scale out of operation, said latch being capable of swinging and provided with a lug, a bar engaging one side of the lug and arranged to be engaged by the opposite side of the lug when the latch swings, whereby the latch will be tripped automatically, substantially as described.

7. In a scale, the combination of a vertically-movable load-receiver, a latch for locking the scale out of operation, said latch being capable of swinging and provided with a lug, and a bar provided with a shoulder engaging one side of the lug, said bar being adapted to be lifted out of such engagement by the lug when the latch swings, substantially as described.

8. In a scale, the combination of a vertically-movable load-receiver a pivotally-mounted latch for locking the scale out of operation, said latch being provided with a guide and having a transversely-disposed lug arranged at a slight inclination when the latch is in its engaging position, a bar passing through the guide and having a shoulder engaging the upper edge of the lug, and means for yieldingly mounting the bar, substantially as described.

9. In a scale, the combination of a vertically-movable load-receiver a latch for locking the scale out of operation, said latch being provided with a lug, a bar disposed approximately horizontally and arranged above and engaging the lug, a spring connected with and adapted to return the bar, and means for limiting the movement of the same, substantially as described.

10. The combination of a vertically-movable load-receiver, a fixed breaker or support arranged above the same, movable cut-offs located at opposite sides of the breaker or support and provided with weighted arms adapted to close the cut-offs automatically, latches for holding the cut-offs open, and means carried by the load-receiver for tripping the latches and for lifting the arms to open the cut-offs, substantially as described.

11. The combination with a vertically-movable load-receiver, of a chute or hopper located above the load-receiver, the substantially V-shaped breaker or support 101 mounted within the chute or hopper, the cut-offs hingedly mounted within the chute or hopper at opposite sides of the breaker or support and provided with means for automatically closing them, latches for holding the cut-offs open, and tripping devices carried by the load-receiver for engaging the catches, substantially as described.

12. The combination of a vertically-movable load-receiver, a supply chute or hopper having a contracted or tapered lower portion, the V-shaped breaker or support arranged within the supply chute or hopper and spaced from the breaker or support, cut-offs mounted at opposite sides of the latter, and means operated by the load-receiver for opening and closing the cut-offs, substantially as described.

13. The combination of a vertically-movable load-receiver, a supply chute or hopper having oppositely-inclined lower portions, the inclined deflectors arranged within the supply chute or hopper, the V-shaped breaker mounted within the chute or hopper and spaced from the inclined lower portions of the same to provide opposite passages, cut-offs hinged at the lower edges of the inclined deflectors, and means operated by the load-receiver for opening and closing the cut-offs, substantially as described.

14. The combination of a vertically-movable load-receiver, a cut-off, a latch arranged to hold the cut-off open and provided with an arm or lever having an inclined edge, and provided above the same with a recess, and a tripping device arranged to engage the inclined edge, substantially as and for the purpose described.

15. The combination of a vertically-movable load-receiver, a cut-off having a weighted arm, a latch pivoted at its upper end and arranged to hold the weighted arm in an elevated position, a lever or arm connected with and spaced from the catch and provided with an inclined edge, and a tripping device carried by the load-receiver and arranged to engage the inclined edge, substantially as described.

16. The combination of a vertically-movable load-receiver, a supply chute or hopper, cut-offs mounted within the chute or hopper and provided with weighted arms, the latches pivoted at opposite sides of the chute or hopper and arranged to hold the arms elevated and provided with depending arms or levers, the tripping devices carried by the load-receiver and arranged to engage the arms or levers, and the lifting devices carried by the said load-receiver and arranged to engage the weighted arms of the cut-offs, substantially as described.

17. The combination of a vertically-movable load-receiver provided at the top with an entrance-opening, a valve pivoted to the load-receiver and arranged to swing inward and outward to vary the size of the entrance-opening, the pivoted cut-off mounted on the load-receiver and arranged on the exterior of the valve and adapted to swing inward and outward over the same, and means arranged to be engaged by the cut-off for opening and closing the same, substantially as described.

18. The combination of a vertically-movable load-receiver provided at the top with an entrance-opening, an adjustable valve or cut-off pivotally mounted and arranged to vary the size of the said opening, a ratchet-wheel connected with the valve or cut-off, a pawl for locking the ratchet-wheel against movement in either direction, and an automatically-operating cut-off for covering the opening when the load-receiver moves downward, substantially as described.

19. The combination of a vertically-movable load-receiver provided at the top with an entrance-opening, the automatically-operating oscillatory valve arranged to swing inward and outward to cover and uncover the said opening, and provided with an arm, and means arranged to be engaged by the arm for opening and closing the cut-off when the load-receiver moves upward and downward, substantially as described.

20. The combination of a vertically-movable load-receiver provided with an entrance-opening, a hinged valve mounted on the load-receiver and arranged to swing inward and outward to cover and uncover the said entrance-opening, said valve being provided with an arm rigid with it, and fixed stops arranged in the path of the arm and located above and below the same, whereby the valve is automatically opened and closed when the load-receiver moves upward and downward, substantially as described.

21. The combination of a vertically-movable load-receiver provided with an entrance-opening, a movable cut-off mounted on and carried by the load-receiver and provided with an arm, and stops arranged to be engaged by the arm when the load-receiver moves upward and downward, one of the stops being disposed vertically and forming a track for holding the cut-off in its closed position, substantially as described.

22. The combination of a vertically-movable load-receiver provided at its top with opposite openings, oscillating cut-offs arranged to cover and uncover the said openings and provided with arms, stops arranged to engage the arms to open the cut-offs, and vertical tracks arranged to engage the arms and close the cut-offs, and maintain the same in such position during the major portion of the vertical movement of the load-receiver, substantially as described.

23. The combination of a vertically-movable load-receiver provided at its top with opposite openings, oscillating cut-offs provided with arms, a plate or frame having vertical flanges forming tracks and arranged to be engaged by the arms, and adjustable stops mounted on the plate or frame and arranged to engage the arms, substantially as described.

24. The combination of a vertically-movable load-receiver, a tapered sleeve provided with a spreader, a neck located below the spreader and extending beyond the same to form opposite openings, the oscillating cut-offs mounted beyond the neck and arranged to cover and uncover the said openings, and means for actuating the cut-offs, substantially as described.

25. The combination of a vertically-movable load-receiver, a tapering sleeve mounted within the same, a spreader arranged at the bottom of the sleeve, a neck spaced from the sleeve to form ways and extended beyond the spreader, the adjustable cut-offs or valves arranged to extend inward over the neck, and the automatically-operating cut-offs arranged to close the openings at the top of the neck, substantially as described.

In testimony that I claim the foregoing as my own I have hereto affixed my signature in the presence of two witnesses.

PEETE B. CLARKE.

Witnesses:
HENRY H. GRAFF,
THOMAS HOLDER, Jr.